(No Model.)

J. E. PRICE.
ELECTRIC CONDUIT.

No. 453,733.    Patented June 9, 1891.

Witnesses
C. M. Gallaher
N. T. Collamer

Inventor
Jno. E. Price
By his Attorneys,
C. A. Snow & Co.

UNITED STATES PATENT OFFICE.

JOHN E. PRICE, OF DENVER, COLORADO.

ELECTRIC CONDUIT.

SPECIFICATION forming part of Letters Patent No. 453,733, dated June 9, 1891.

Application filed January 7, 1891. Serial No. 377,016. (No model.)

*To all whom it may concern:*

Be it known that I, JOHN E. PRICE, a citizen of the United States, residing at Denver, in the county of Arapahoe and State of Colorado, have invented a new and useful Electric Conduit, of which the following is a specification.

This invention relates to electric conduits for underground use; and the object of the same is to improve such conduits by rendering them proof against moisture; and the same is so constructed that a lid can be removed at any point along the line of the conduit-main to admit of the wires or pipes therein being inspected without disturbing the same or any other part of the conduit.

To this end the invention consists of the details of construction hereinafter more fully described and claimed, and as illustrated in the accompanying sheet of drawings, wherein—

Figure 1:
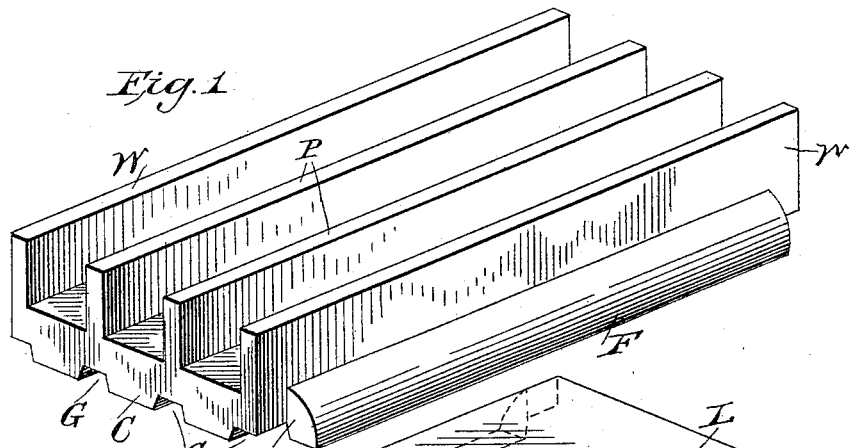
Figure 2:
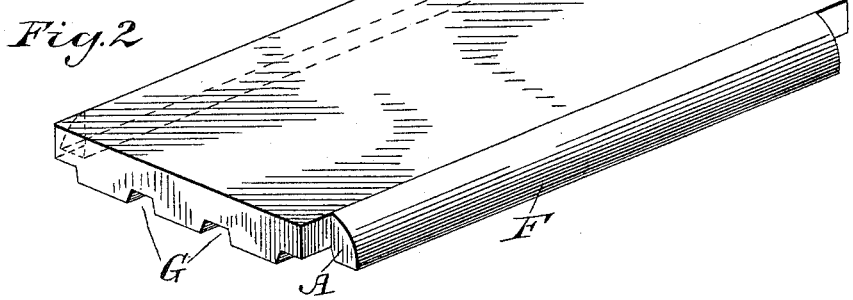
Figure 3:
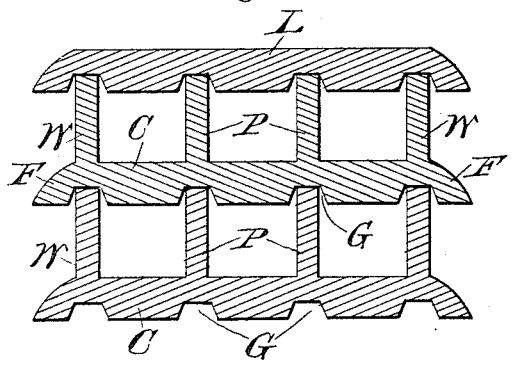
Figure 4:
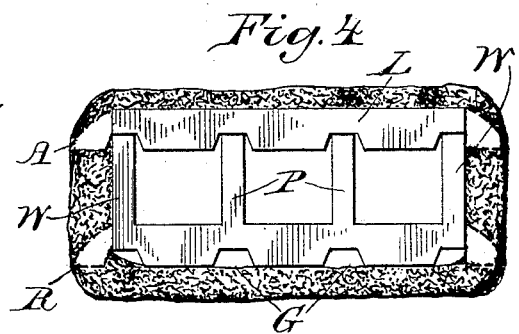

Figure 1 is a perspective view of a length of this conduit. Fig. 2 is a similar view of a length of the lid therefor, showing the flanges cut away near the ends of the conduit to allow a water-tight joint to be made, as below described. Fig. 3 is a cross-section, and Fig. 4 an end elevation, of this conduit.

Referring to the said drawings, the letter C designates the body of my improved conduit, which is provided with side walls W and with vertical longitudinal partitions P, of the same height as the walls, and in the lower face of the conduit, beneath each wall and each partition, is a longitudinal groove G. At each side of the conduit is an outwardly-projecting flange F, curving downwardly and cut away at its ends, as at A.

The letter L designates the lid of my improved conduit, which is of precisely the same construction as the conduit proper, except that the side walls W and partitions P are omitted. These parts are of clay or fire-clay burned and vitrified, or of some other suitable plastic material sufficiently light and strong and water-proof in its nature and a good non-conductor of electricity.

In assembling the parts of my improved conduit the conduit proper is first laid in the trench, the wires (not shown) stretched in the compartments between the partitions or side walls, and the lid then placed upon the conduit proper, when the grooves in the lid will fit closely over the upper edges of the walls and partitions, cement being used or not to seal them, as preferred; or, if preferred, the conduit can be placed with the lid on in the trench and the wires or pipes drawn through by means of man-holes being placed along the line of the conduit-main. If desired, a number of conduits may be built one upon the other, as shown in Fig. 3, and a single lid will close the uppermost, each of the others being closed by the one above. At each end of length of conduit and lid a portion of the flange which projects from the lid proper and from the bottom of the conduit is cut away, as shown by A in Figs. 1 and 2, in order to allow a water-tight joint to be made by wrapping the joint with some waterproof material R, such as burlap immersed in tar or something similar. A joint of this nature, together with the projecting flanges F, will prevent water from gaining entrance to the interior of the conduit, making the conduit-main water-proof. A conduit of this character will be found to shed water very effectually, and the flanges F, by projecting beyond the junctions between the side walls and the closures above, will prevent water from gaining entrance to the interior of the conduit.

What is claimed as new is—

1. The herein-described conduit, the same comprising a body C, having longitudinal grooves G in its lower face, upwardly-projecting side walls W and intermediate partitions P, rising from said body, and downwardly-curved side flanges F, projecting from said body and flush with the lower face thereof, and a lid L, provided with similar grooves and flanges, as and for the purpose set forth.

2. The herein-described conduit, the same comprising a body C, having longitudinal grooves G in its lower face, vertical side walls W and intermediate partitions P, rising from said body and extending longitudinally thereof, and downwardly-curved side flanges F, projecting laterally from said body, extending longitudinally thereof and flush with its lower face, the ends of said flanges being cut away, as A, at the end of each length, and a lid L, provided with similar grooves and flanges, and the latter being similarly cut away.

In testimony that I claim the foregoing as my own I have hereto affixed my signature in presence of two witnesses.

JOHN E. PRICE.

Witnesses:
F. L. BELLAN,
THOS. S. MACKENZIE.